United States Patent [19]

Okamoto

[11] Patent Number: 5,544,832
[45] Date of Patent: Aug. 13, 1996

[54] BRAKE DEVICE FOR USE IN A FISHING REEL

[75] Inventor: Naoki Okamoto, Tokyo, Japan

[73] Assignee: Daiwa Seiko, Inc., Tokyo, Japan

[21] Appl. No.: 325,089

[22] Filed: Oct. 17, 1994

[30] Foreign Application Priority Data

Oct. 21, 1993 [JP] Japan ................... 5-61375 U

[51] Int. Cl.⁶ ............... A01K 89/027; A01K 89/033
[52] U.S. Cl. ............ 242/245; 242/246; 242/268; 242/306
[58] Field of Search ................... 242/244, 245, 242/246, 285, 302, 303, 304, 306, 307, 268

[56] References Cited

U.S. PATENT DOCUMENTS

| | | | |
|---|---|---|---|
| 3,682,411 | 8/1972 | Dumbauld | 242/246 |
| 4,442,983 | 4/1984 | Moll | 242/304 |
| 4,488,689 | 12/1984 | Councilman | 242/302 X |
| 4,513,925 | 4/1985 | Yamaguchi | 242/245 |
| 4,702,432 | 10/1987 | Kaneko et al. | 242/246 |
| 4,930,722 | 6/1990 | Toda | 242/246 X |
| 4,943,012 | 7/1990 | Aoki | 242/307 X |
| 5,007,602 | 4/1991 | Carlsson | 242/306 X |
| 5,312,067 | 5/1994 | Sugawara et al. | 242/246 X |

FOREIGN PATENT DOCUMENTS

| | | |
|---|---|---|
| 62-107672 | 7/1987 | Japan . |
| 62-107673 | 7/1987 | Japan . |
| 1-44063 | 12/1989 | Japan . |

*Primary Examiner*—Joseph J. Hail, III
*Attorney, Agent, or Firm*—Longacre & White

[57] ABSTRACT

In a brake device for use in a fishing reel which is used to apply a brake force to a spool and is also adjustable, a spring member used not only to maintain the moderation of the rotational direction of an adjust member but also to prevent the adjust member from being loosened is made up of a closed circular frame which is elastically deformable and fitted into a short cylindrical portion of a braking force adjust member. The spring member is further formed with an engaging projected portion and a securing portion both formed in the frame and respectively engaged with an engaging uneven portion and a lower engaging recessed portion of the adjust member. When the adjust member is rotated, moderation is given to the rotation of the adjust member by the action of the elastically deformation of the frame with the aid of the engaging projected portion and the engaging projected uneven portion.

11 Claims, 6 Drawing Sheets

BRAKE DEVICE FOR USE IN A FISHING REEL

BACKGROUND OF THE INVENTION

The present invention relates to a spool brake device for use in a fishing reel, and, in particular, to an improvement for a spring used not only to prevent an adjust member of the spool brake device from being loosened but also to maintain the moderation of rotation of the adjust member.

Generally, a brake device, which applies a brake force to a spool of a fishing reel, has a spring which is used not only to provide a click feeling in rotational operation of an adjust member during the adjustment of the braking force but also to prevent the loosening of the adjust member after the adjustment is achieved. A typical spring is disclosed in Japanese Utility Model Kokoku Publication No. Hei. 1-44063. The spring is a partially cutaway annular, body and has a securing portion formed in the cutaway portion and an engaging projection on the top portion opposite from the cutaway portion.

However, the above-mentioned conventional partially cutaway annular spring has the following disadvantages: it is difficult to manufacture the above-mentioned conventional partially cutaway annular spring in such a manner that it has elasticity of a constant quality and, therefore, it is impossible to manufacture a brake device which has a constant quality in the click feeling. Also, there must be prepared a large number of springs before they are assembled during such preparation, the two ends thereof, serving as securing portions, are easy to get tangled with one another so that it is troublesome to take out the springs one by one quickly. Further, the cutaway shape of the spring makes it difficult to assemble the spring into the brake device. That is, the conventional spring cannot be assembled with good efficiency.

SUMMARY OF THE INVENTION

The present invention aims at eliminating the drawbacks found in the conventional brake device. Accordingly, it is an object of the invention to provide a new structure for a spring used in a brake device of a fishing reel, by which the defects of the above-mentioned partially cutaway annular spring are solved, the quality of the springy action of the spring can be maintained constant, and the spring can be manufactured and assembled with high efficiency.

In attaining the above object, according to the invention, there is provided a spring member incorporated in a brake device of a fishing reel for providing a click feeling during a rotational operation of a braking force adjust member and preventing an undesirable free rotation of said adjust member. The spring member includes a frame in the form of a closed annulus and elastically deformable; an engagement projection formed in said frame; and a securing portion formed in said frame and located diametrically opposite from said engagement projection.

The present invention further provides a brake device for use in a fishing reel which applies a brake force to a spool. The braking force is adjustable with a rotatable adjust member, and characterized by including: a spring member, interposed between said adjust member and a first member rotatable relative to said adjust member, for providing a click feeling during a rotational operation of said adjust member and preventing an undesirable free rotation of said adjust member. The spring member has a frame in the form of a closed annulus and elastically deformable; an engagement projection formed in said frame and elastically engaged with one of said adjust member and said first member; and a securing portion formed in said frame, located diametrically opposite from said engagement projection, and engaged with the other of said adjust member and said first member.

According to the invention, since the spring member is formed as a closed, entirely annular shape, the elasticity of the spring member can be maintained constant, and thus the click feeling and moderation in the rotational operation of the adjust member as well as the adjust member loosening preventive action can be maintained constantly, and the entirely annular shape of the spring member prevents the spring members from getting tangled with one another so that the spring members can be assembled easily into the braking device.

DETAILED DESCRIPTION OF THE PREFERRED EMBODIMENTS

Figure 1:
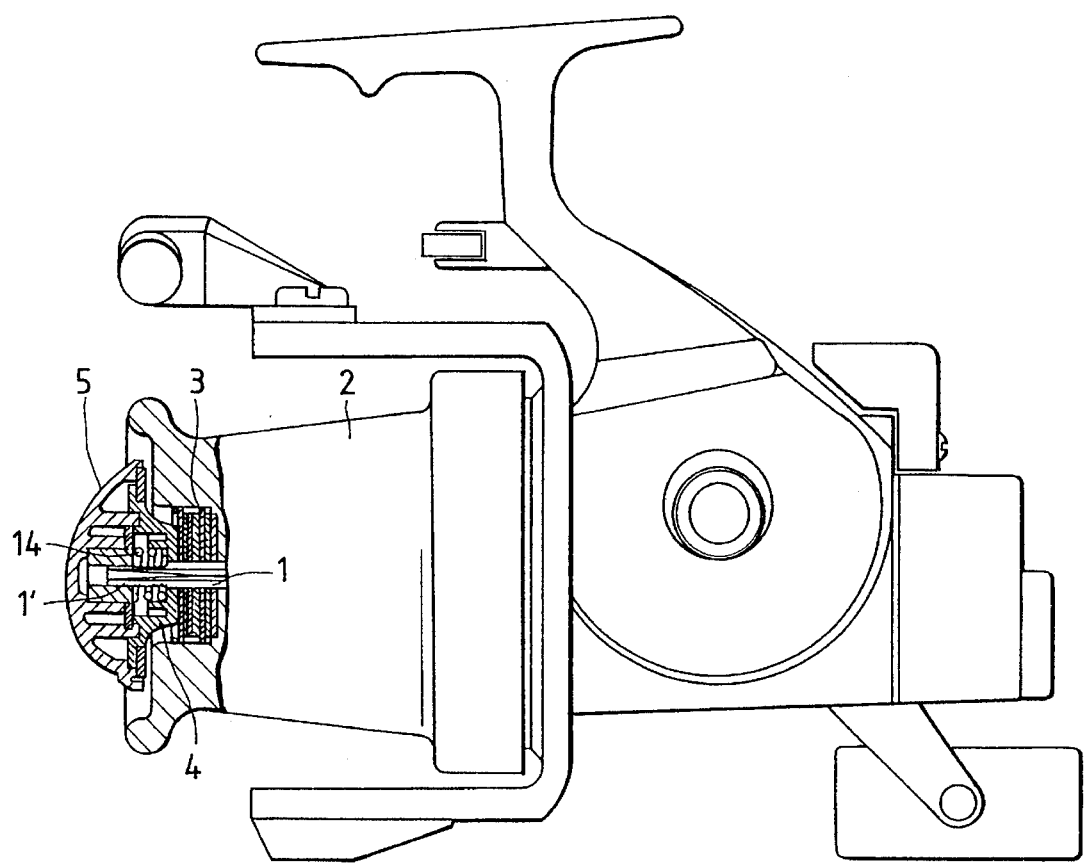
FIG. 1 is a partially cutaway front view of a brake device having a new spring, which constitutes a first embodiment of the invention.
Figure 2:
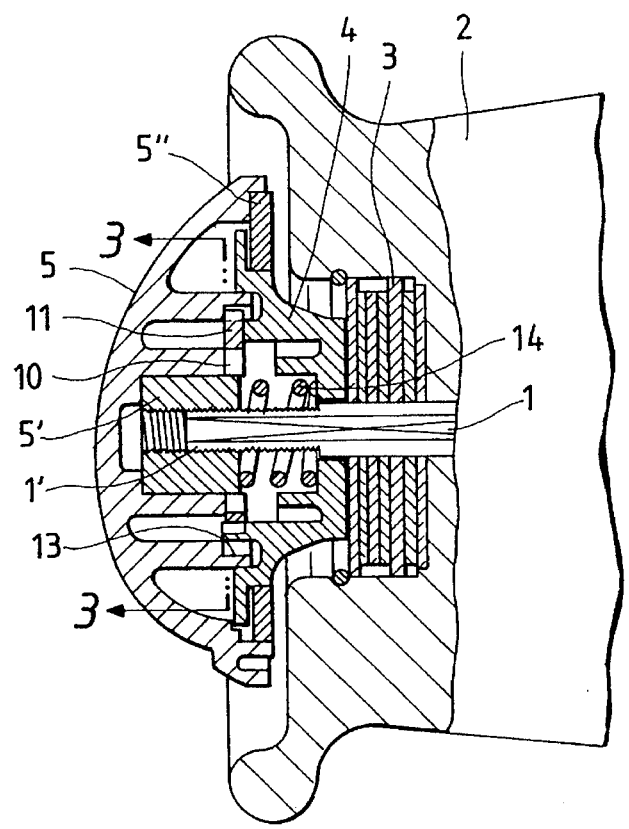
FIG. 2 is a longitudinal front view showing main portions of the brake device.
Figure 3:
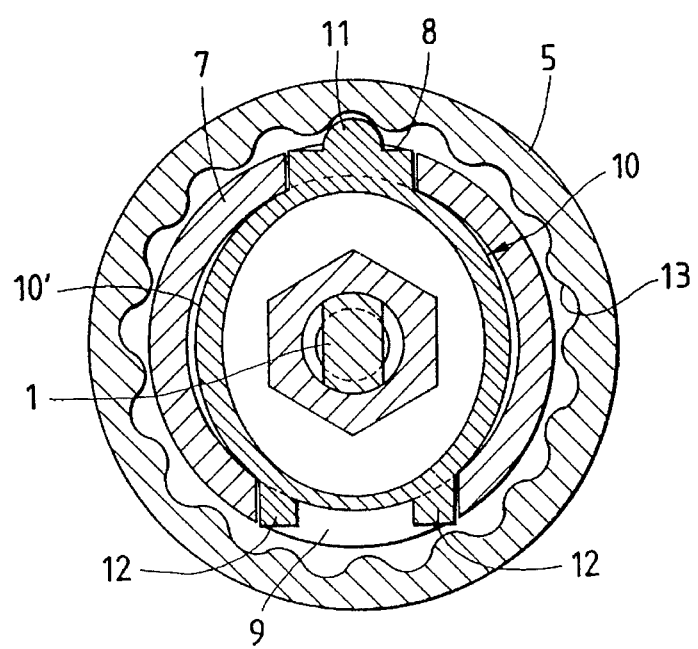
FIG. 3 is a section view taken along line 3—3 of FIG. 2.
Figure 4:
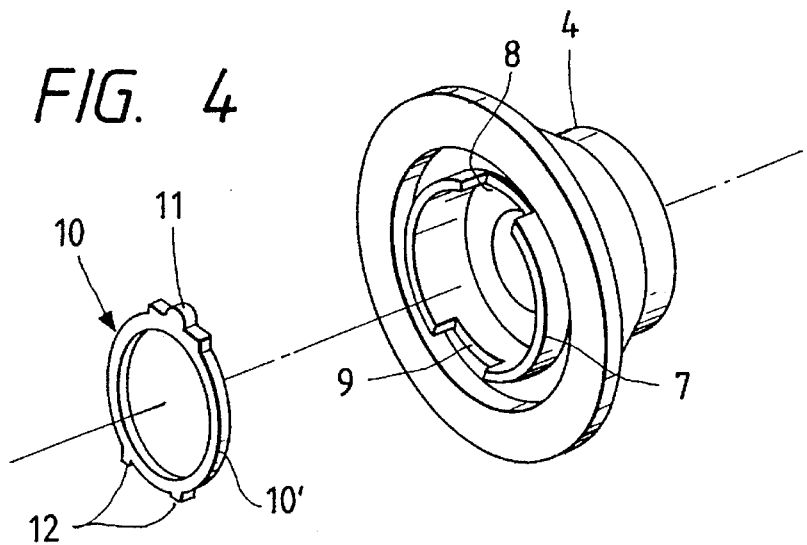
FIG. 4 is a perspective view showing main portions of the brake device.
Figure 6:
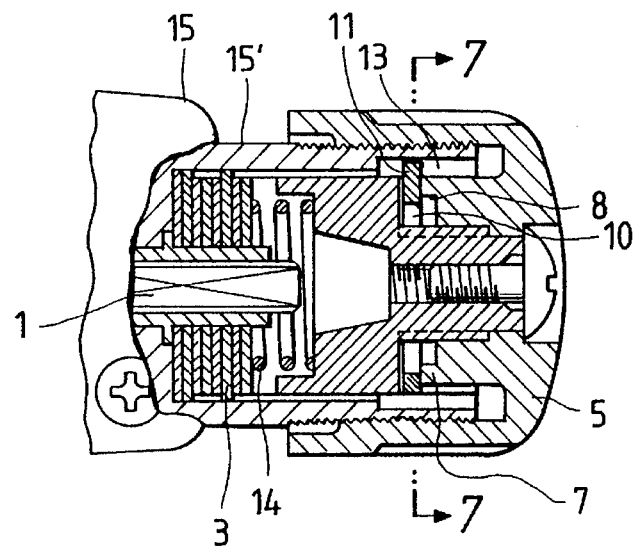
FIG. 6 is a longitudinal front view showing main portions of the brake device shown in FIG. 5.

Preferred embodiments of the present invention will now be described with reference to the accompanying drawings. A brake device for use in a fishing reel includes a spool shaft 1 which can be moved back and forth in linking with the rotation of a handle, an adjust member 5 into which a nut 5' in threaded engagement with the leading end portion of the spool shaft 1 is fitted in such a manner that the nut 5' is movable axially but is prevented against rotation, and a pressure member 4 which is rotatable secured to the rear portion of the adjust member by a securing plate 5", the pressure member 4 being engageable with the spool shaft 1 in such a manner that it is prevented against rotation with respect to the spool shaft 1. In this structure, if the adjust member 5 is rotated, then the pressure member 4 presses against the front side of a frictional brake member 3 fitted into the front portion of a spool 2 to thereby be able to adjust the brake force of the spool 2 between strong and weak levels.

The pressure member 4 includes in the outside portion thereof a short cylindrical portion 7 which in turn includes an upper engaging recessed portion 8 and a lower engaging recessed portion 9. A spring member 10 according to the present invention is fitted in the short cylindrical portion 7. The spring member 10 includes a closed circular or annular frame 10' elastically deformable and formed of nylon, polyacetal, metal or the like, an engaging projected portion 11 formed integrally with the upper portion of the closed circular frame 10' and a securing portion 12 formed integrally with the lower portion of the closed circular frame 10' and located opposite from the securing portion 12. The engaging projected portion 11 is engaged with the upper engaging recessed portion 8 of the short cylindrical portion 7, and the securing portion 12 is engaged with the lower engaging recessed portion 9 thereof. Further, the engaging projected portion 11 is elastically engaged with an engaging uneven portion 13 formed in the inner peripheral side of the adjust member 5. In the drawings, reference character 14 designates a coil spring which is interposed between the adjust member 5 and pressure member 4 for depressing the pressure member 4 against the braking plate 3.

In the braking device incorporating therein the spring member 10 according to the present invention is structured in the above-mentioned manner, the spring means for providing the click feeling or rotative modulation in cooperation with the uneven portion 13 of the adjust member 5 and preventing the undesirable rotation relative to the adjuster member 5 in cooperation therewith is mainly made up of the frame 10' which is in the form of the closed circle or endless configuration. Thus, the elastic deformation of the spring member 10 during and after the braking force adjustment operation can be kept uniformly, so that a brake device of a constant quality can be manufactured. Further, the assembling and mounting of the spring member 10 into the brake device can be achieved smoothly and easily. Furthermore, the shape of the spring member 10 eliminates the entanglement of the springs with one another as in the conventional U- or V-shape spring, so that the spring members can be handled easily and thus the manufacturing operation can be performed with high efficiency.

Figure 7:
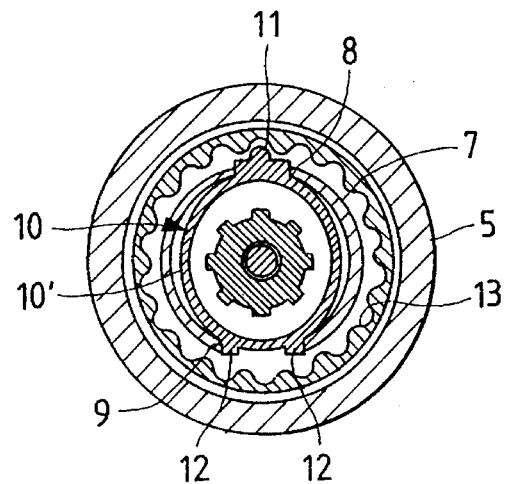
FIG. 7 is a section view taken along line 7—7 of FIG. 6.
Figure 5:
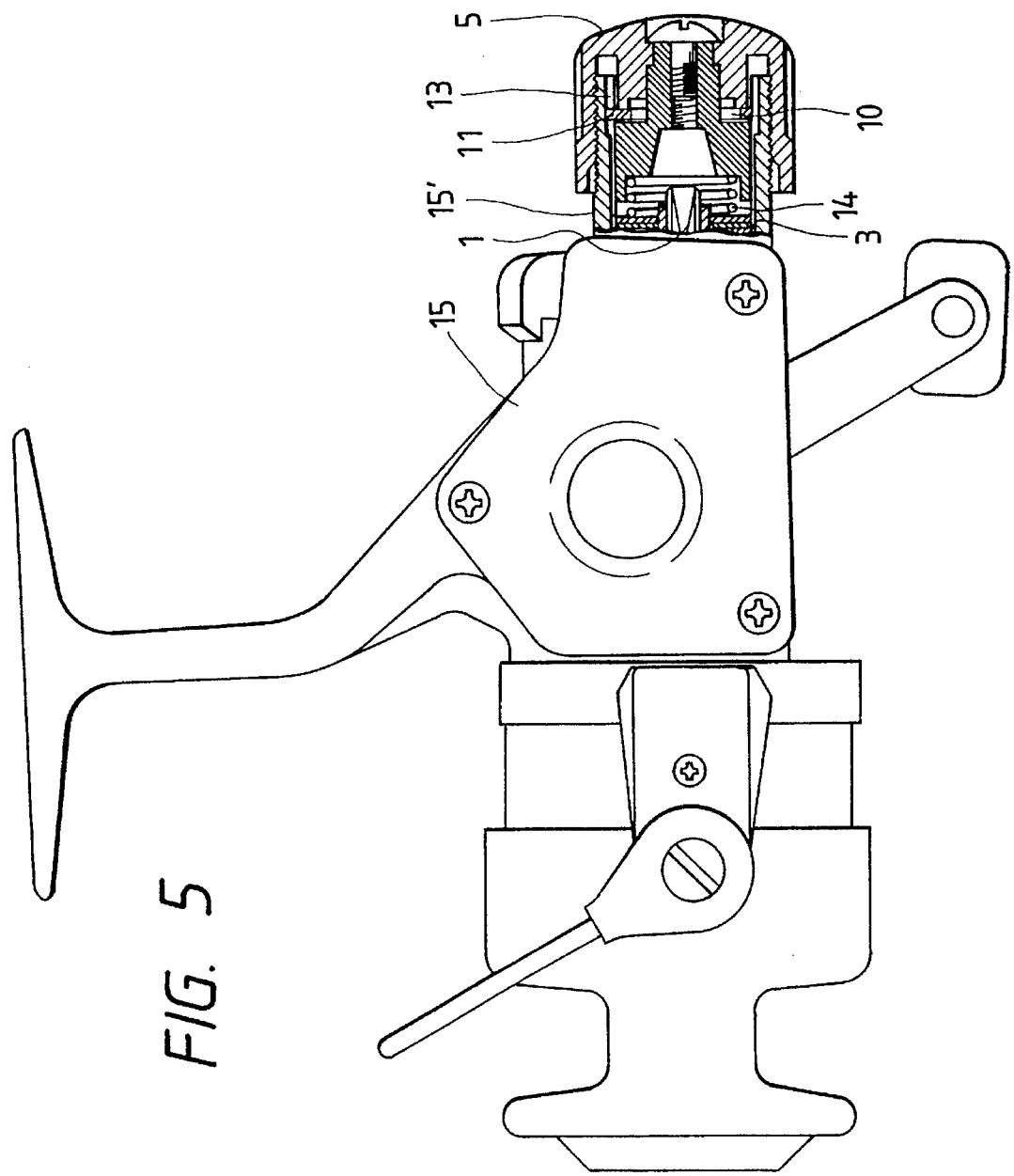
FIG. 5 is a partially cutaway front view of a brake device having a new spring, which constitutes a second embodiment of the invention.

Now, in FIGS. 5 and 7, there is shown another embodiment of the present invention. The brake device shown in these drawings is used in a spinning reel of a rear drag type. In the present embodiment, a frictional brake member 3 fitted into the rear end portion of a spool shaft 1 is depressed against the bottom portion of a cylindrical portion 15' through a coil spring 14 by an adjust member 5 threadedly engaged in a freely advanceable and retreatable manner with the cylindrical portion 15' which is disposed in the rear portion of a reel main body 15. An upper engaging portion 8 and a lower engaging portion 9 are disposed in a short cylindrical portion 7 in the adjust member 5. The upper and lower engaging portions 8 and 9 are respectively engageable with an engaging projected portion 11 and a securing portion 12 respectively provided in a spring member 10 and, further, the engaging projected portion 11 is elastically engageable into an engaging uneven portion 13 formed in the inner peripheral surface of the cylindrical portion 15'. The spring member 10 is mainly made up of a closed circular or annular frame 10'.

Next, in FIGS. 8 to 11, there is shown a further embodiment of the present invention. In these drawings, a brake device is used in a dual-bearing type reel.

Figure 8:
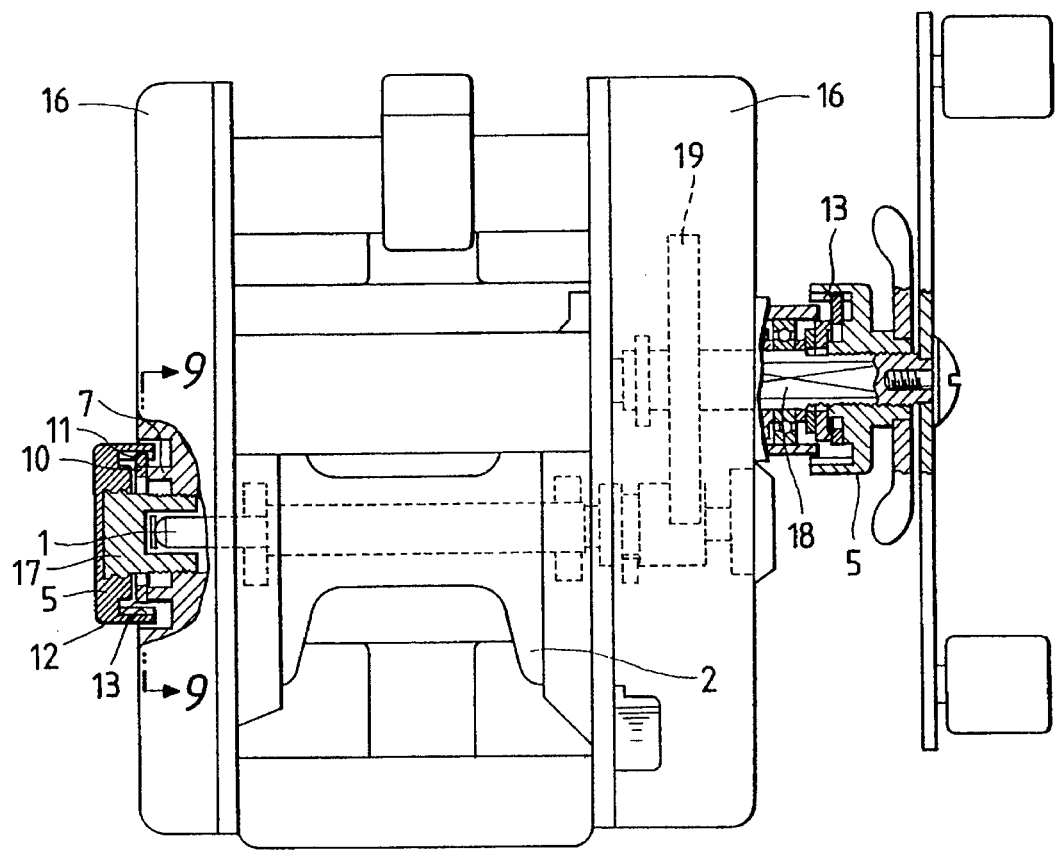
FIG. 8 is a partially cutaway front view of a brake device having a new spring, which constitutes a third embodiment of the invention.
Figure 9:
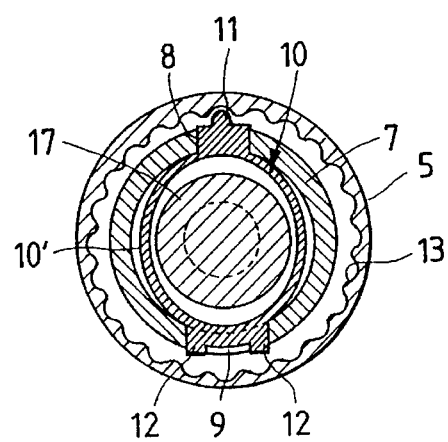
FIG. 9 is a section view taken along line 9—9 of FIG. 8.
Figure 10:
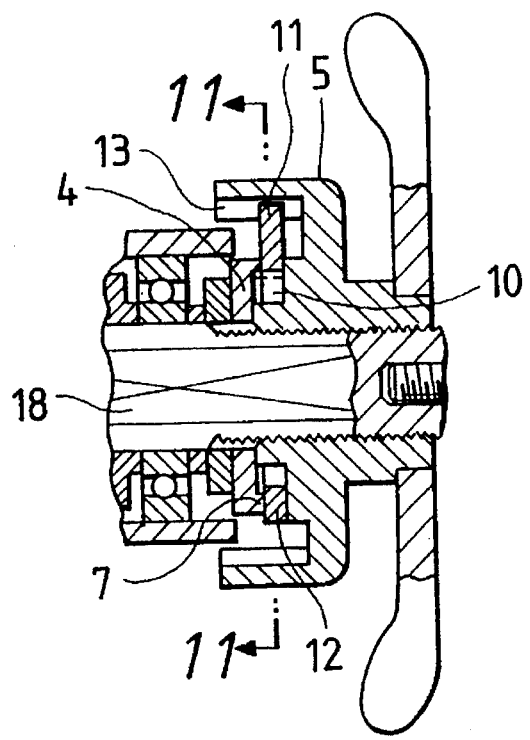
FIG. 10 is a longitudinal front view of main portions of the brake device shown in FIG. 8.
Figure 11:
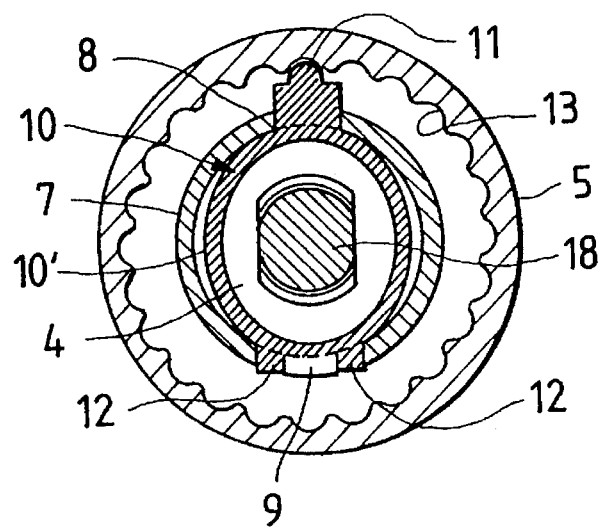
FIG. 11 is a section view taken along line 11—11 of FIG. 10.

One end portion of a spool shaft 1, to which is fixed a spool 2 supported rotatably between reel side plates 16 and 16, is supported in a pressure-contactable manner by a bearing cylinder 17 threadedly engaged in a freely advanceable and retreatable manner with the reel side plate 16, as shown in FIG. 8. As shown in FIG. 9, an engaging uneven portion 13 is formed in the inner peripheral surface of an adjust member 5 fixed to the bearing cylinder 17 and an upper engaging recessed portion 8 and a lower engaging recessed portion 9 are respectively formed in the upper and lower portions of a short cylindrical portion 7 disposed in the reel side plate 16. And, an engaging projection 11, which is formed in a spring member 10 fitted into the inside of the short cylindrical portion 7, is engaged with the engaging uneven portion 13 through the engaging recessed portion 8 and a securing portion 12 is engaged with the engaging recessed portion 9. The spring member 10 is mainly made up of a closed circular or annular frame 10'. Thus, the degree of the pressure contact between the spool shaft 1 and the brake cylinder 17 can be adjusted by means of rotation of the adjust member 5 in order to adjust the braking force to the spool shaft 1.

On the other hand, another adjust member 5 (see the right-hand portion of FIG. 8, and FIGS. 10 and 11) including an engaging uneven portion 13 is threadedly engaged in an advanceable and retreatable manner with a handle shaft 18 operable in linking with the spool shaft 1. A short cylindrical portion 7 is formed in a pressure member 4 which is depressed against a frictional brake member of a drive gear 19 and which is also mounted on the handle shaft 18 in a rotation preventive manner. The spring member 10 is, similarly to the previous embodiments, engaged with the short cylindrical portion 7 so that the engaging projected portion 11 is engaged with the engaging uneven portion 13. Accordingly, the degree of the contact pressure between the drive gear 19 and the friction brake member is adjusted by means of rotation of the adjust member 5 to thereby be able to brake the spool.

Although the present invention has been described along three embodiments, the invention should not be restricted thereto or thereby. For example, the present invention can be applied to a system for pulling a spool shaft in a dual-bearing type reel to thereby apply a brake force to a spool as disclosed in Japanese Utility Model Kokai Publication No. Sho. 62-107672, and, further, to a sound-generating spring which is provided in a drag operation lever of leverage type as disclosed in Japanese Utility Model Kokai Publication No. Sho. 62-107673.

According to the invention, in a brake device which applies a brake force to a spool of a fishing reel, a spring means used not only to provide click feeling or rotative modulation of a braking force adjust member but also to attain the retainment of the adjust member against the undesirable rotation is mainly made up of a closed circular or annular frame which is elastically deformable. Further, an engaging projected portion is formed in one outside portion of the annular frame and a securing portion is formed in the other outside portion thereof. Thanks to this structure, it is possible to easily manufacture the spring means of a constant quality or a constant elastic property, which, in turn, enables the manufacture of a brake device providing a uniform spring action which can realize the maintenance of the moderation of the rotational direction of the adjust member as well as the prevention of loosening of the adjust member. It is also possible to surely prevent the springs from getting tangled with one another during preparation for assembling, so that the springs can be taken out one by one with ease. Further, since the spring is formed in an entirely annular shape or endless shape, the spring can be assembled smoothly and easily. Therefore, the present invention can provide a brake device which has excellent characteristics and practicality, that is, which can be manufactured and assembled quickly and efficiently.

What is claimed is:

1. A spring member incorporated in a brake device of a fishing reel for providing a click feeling during a rotational operation of an adjust member and preventing an undesirable free rotation of said adjust member, said adjust member being used to adjust a braking force of said brake device to a spool, said spring member comprising:

a frame in the form of a closed annulus elastically and restorably deformable in a radial direction;

an engagement projection formed in said frame, wherein when said frame is deformed said projection is displaced in the radial direction with no significant displacement in the axial direction; and a securing portion formed in said frame and located diametrically opposite from said engagement projection.

2. A spring member according to claim 1, wherein said engagement projection extends radially outwardly from said frame.

3. A spring member according to claim 1, wherein said frame, engagement projection and securing portion are simultaneously formed together to present a single, integral piece.

4. A spring member according to claim 1, said securing portion having a pair of projections extending radially outwardly from said frame.

5. A brake device for use in a fishing reel which applies a brake force to a spool, said braking force being adjustable with a rotatable adjust member, said brake device comprising:

a spring member, interposed between said adjust member and a first member rotatable relative to said adjust member, said spring member comprising;

a frame in the form of a closed annulus elastically and restorably deformable in a radial direction;

an engagement projection formed in said frame, wherein when said frame is deformed said projection is displaced in the radial direction with no significant displacement in the axial direction; and a securing portion formed in said frame, located diametrically opposite from said engagement projection, and engaged with one of said adjust member and said first member; the other of said adjust member and said first member having an uneven surface to engage with said engagement projection of said spring, wherein when said adjust member and said first member are rotated relative to one another said engagement projection of said spring is displaced providing a click feeling and preventing undesirable rotation.

6. A brake device according to claim 5, wherein said engagement projection extends radially outwardly from said frame.

7. A brake device according to claim 5, wherein said frame, engagement projection and securing portion are simultaneously formed together to present a single, integral piece.

8. A brake device according to claim 5, said securing portion having a pair of projections extending radially outwardly from said frame.

9. A brake device according to claim 5, wherein said first member includes a pressure member.

10. A brake device according to claim 5, wherein said first member includes a portion of a main body of said fishing reel.

11. A brake device for use in a fishing reel, said braking force being adjusted by a rotatable adjust member, comprising;

a spring member radially interposed between said adjust body and a first member, said first member and said adjust body capable of relative rotation therebetween, said spring comprising;

a frame in the form of a closed annulus elastically and restorably deformable in a radial direction without significant axial deformation;

an engagement projection formed in said frame extending outward in the radial direction; and a securing portion formed in said frame extending outward in the radial direction;

said first member fixedly engaging said securing portion of said frame so as to prevent relative rotation between said spring and said first member;

said adjust body having an uneven internal surface to engage with said engagement portion of said spring, wherein when said adjust body is rotated relative to said first member and said spring, said engagement projection is deformed in the radial direction to provide a click feeling and prevent undesirable rotation therebetween.

* * * * *